United States Patent [19]

Peña-Medina

[11] Patent Number: 4,476,843

[45] Date of Patent: Oct. 16, 1984

[54] APPARATUS FOR INCREASING THE EFFICIENCY OF CARBURETORS FOR INTERNAL COMBUSTION ENGINES

[76] Inventor: Sergio Peña-Medina, Calle de Pachuca Manz. 32 Lote 10, Col. San Jerónimo Lídice, 10400, Mexico City, Mexico

[21] Appl. No.: 476,066

[22] Filed: Mar. 17, 1983

[30] Foreign Application Priority Data

Dec. 10, 1982 [MX] Mexico ................................. 195571

[51] Int. Cl.³ .............................................. F02M 23/06
[52] U.S. Cl. .................................... 123/585; 123/593; 48/189
[58] Field of Search ............... 123/585, 589, 596, 593; 48/180.1, 189.3, 189.4

[56] References Cited

U.S. PATENT DOCUMENTS

| | | | |
|---|---|---|---|
| 1,029,898 | 6/1912 | Stewart | 123/585 |
| 1,549,624 | 8/1925 | Stransky | 48/189.3 |
| 1,610,507 | 12/1926 | Foley | 48/189.3 |
| 1,942,187 | 1/1934 | Ruffino | 123/585 |
| 2,373,867 | 4/1945 | Wepplo | 48/189.3 |
| 3,459,162 | 8/1969 | Burwinkle et al. | 123/593 |
| 3,943,900 | 3/1976 | Primrose | 123/590 |
| 3,973,534 | 8/1976 | Amos | 123/574 |
| 4,137,875 | 2/1979 | Medina | 123/585 |

Primary Examiner—William A. Cuchlinski, Jr.
Attorney, Agent, or Firm—Darby & Darby

[57] ABSTRACT

An apparatus for increasing the efficiency of carburetors for internal combustion engines comprises a base having an opening for the passage of the fuel mixture from the carburetor and having a cavity for controlledly admitting secondary air towards said opening, through a plurality of conduits extending within the opening, a first grid partially spanning the throat of the carburetor and a second grid partially spanning the opening at the level of the surface of the base which engages the admission manifold of the engine, such that a non-obstructed gap is left between said grids at the opening. Also, a filter is provided in said cavity, said filter having control valves for admitting air into said cavity, said valves being adjustable for controlling the amount of air to be admitted into the opening.

11 Claims, 3 Drawing Figures

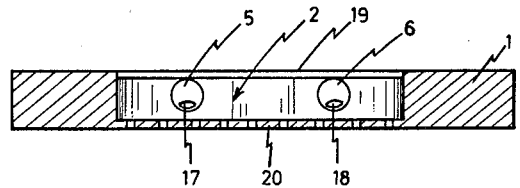
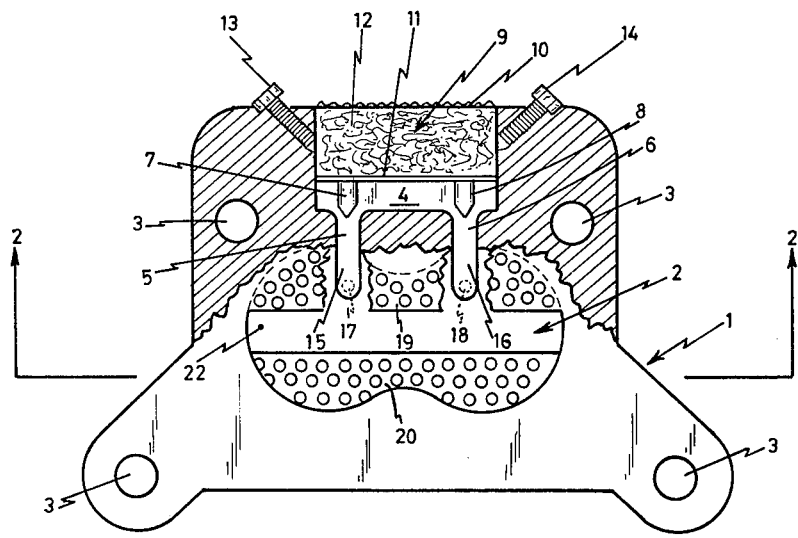

APPARATUS FOR INCREASING THE EFFICIENCY OF CARBURETORS FOR INTERNAL COMBUSTION ENGINES

FIELD OF THE THE INVENTION

The present invention refers to improvements in or relating to an apparatus for increasing the efficiency of carburetors for internal combustion engines and, more particularly, it is related to a device for improving the fuel-air mixture fed by a carburetor of an internal combustion engine and at the same time for introducing secondary combustion air.

BACKGROUND OF THE INVENTION

Many adapters are known in the prior art, which have been designed for installation between the carburetor and the admission manifold of an internal combustion engine, in order to extract air from the atmosphere and inject the same towards the throats of the carburetor in order to improve the mixture of air and fuel and the economy in the utilization of said fuel. Some of said devices are illustrated and described in U.S. Pat. Nos. 1,029,898; 1,118,865; 1,558,605; 1,748,203; 1,942,187; 2,337,852; 3,973,534; 3,943,900; and 4,137,875. Other of said devices are shown and described in German Pat. No. 591,918; Austrian Pat. No. 146,751; British Pat. No. 362,941; British Pat. No. 379,951; French Pat. No. 632,416; Italian Pat. No. 258,061, Australian Pat. No. 143,514; and Mexican Pat. No. 124,232.

The devices shown and described in practically all of the above mentioned patents, are irrelevant to the device of the present invention, inasmuch as they provide apparatus having circumferential passages around the opening, and the air from the atmosphere is injected towards the passage before entering the opening of the auxiliary device for air admission. However, in U.S. Pat. No. 1,558,605 and in Austrian Pat. No. 146,751, a wire mesh or grid is placed across the opening, said grid being used in order to break the incoming mixture of fuel and air, and more air is injected towards the opening from the atmosphere through an orifice passing through the walls of the device but without entering towards the interior of the cavity.

On the other hand, in Mexican Pat. No. 124,232, granted to the same applicant of the instant application, a device is described for installation between the carburetor and the admission manifold of an internal combustion engine and is provided with one or more secondary air inlet pipes partially extending into the opening through which the fuel-air mixture passes, each of said tubes having, adjacent thereto, perforate dispersing plates which extend partially into the opening. The present application describes and claims an improvement with respect of the device of Mexican Pat. No. 124,232.

Finally, in U.S. Pat. No. 4,137,875, also granted to the same applicant hereof, there is described and claimed a device which is provided with a perforate plate covering the total area of the opening, on the lower part of the same, and a plurality of air distribution pipes is arranged on said perforate plate, said pipes being connected through openings and a filter with the exterior atmosphere, said pipes being perforate and containing, in the preferred embodiment of the invention, a plurality of branches, in order to suitably distribute the air throughout the opening, the said perforate plate also causing additional turbulences which increase the homogeneity of the mixture of air and fuel and, therefore, which increase the efficiency of the carburetor. The instant application also represents an improvement over the device described and illustrated in U.S. Pat. 4,137,875.

The device illustrated and described in Mexican Pat. No. 124,232, while highly efficient to improve to a great extent the efficiency of admixing of the air-fuel mixture, thereby producing a more homogeneous mixture and accomplishing a more complete and efficient combustion, in practice has shown certain slight deficiencies as to the production of a perfectly homogeneous mixture of air-fuel and with a sufficient amount of air to be completely burned without undue detonations in the cylinders of the engine to which the same is associated, in view of the fact that the turbulences created by the devices of the apparatus are not sufficient for the mixture to be perfectly homogenized when it reaches the cylinders of the engine. It is for this reason that the device of U. S. Pat. No. 4,137,875 was developed, in order to accomplish the goal of creating, with said device for improving the admixture of air-fuel, very energetic turbulences in view of the interception of the stream by a grid completely covering the opening, with which it was apparent that a better homogeneity of the mixture of air-fuel is accomplished for entering into the admission manifold of the associated engine. However, the provision of this complete grid or perforate plate in a certain way causes slight pressure drops in view of the friction caused by the orifices of the grid and, consequently, it tends to decrease to a certain extent the power of the engine, which represent a serious drawback in view of the fact that, while the device increases the efficiency of the use of the fuel, this is accomplished at the expense of the total power developed by the engine.

Therefore, for long the applicant has sought to improve the devices previously described, in order to overcome the drawbacks and to nevertheless provide the advantages of both devices, that is, the production of a perfectly homogeneous air-fuel mixture having the amount of air sufficient for a complete or practically complete combustion thereof and, at the same time, the obtention of a low pressure drop by friction through the grids of the previously described apparatus.

BRIEF SUMMARY OF THE INVENTION

Having in mind the defects of the prior art devices, it is an object of the present invention to provide an apparatus for increasing the efficiency of carburetors for internal combustion engines, which will be of a very simple construction and nevertheless will enable the production of a perfect air-fuel mixture and at the same time will not produce appreciable pressure drop by friction.

It is another object of the present invention to provide an apparatus of the above mentioned character, which will be capable of serving both with carburetors of one throat and with carburetors of multiple throats.

One other object of the present invention is to provide an apparatus of the above mentioned character, which will not rely on the complete obstruction of the opening or throat by means of a grid, in order to obtain a completely homogeneous air-fuel mixture which may permit its complete combustion.

One other object of the present invention is to provide an apparatus of the above mentioned character, which will be capable of being installed without any change in the admission manifolds and the commercially utilized carburetors for internal combustion engines.

The above objects as well as other ancillary objects and advantages of the invention, are preferably accomplished as follows:

In accordance with a preferred embodiment of the present invention there is provided an auxiliary apparatus for improving the efficiency of carburetors for internal combustion engines, which is an apparatus for the admission and diffusion of secondary air into combustion gases, in order to produce a perfectly homogeneous air-fuel mixture, and which comprises a base of essentially uniform thickness; an opening in said base for alignment with the throat of the carburetor of the engine and with the inlet opening of the admission manifold, a cavity in said base, adapted for admitting air from the atmosphere, a plurality of bores in said base, which communicate said cavity with said opening for admitting air into the same; a corresponding plurality of tubular nozzles which extend from the outlet of said bores to a point located at a distance from the wall of said opening, and at least a grid located above the outlets of said nozzles and partially spanning the opening at the surface where the base contacts the throat of the carburetor, said apparatus being provided with a second grid located at the opposite face of the base which engages the manifold, and at a diametrally opposite position in said opening, such that between said grids there will be a nonobstructed gap in said opening.

The admission of secondary air which is effected through the filter of the apparatus of the present invention, is preferably controlled by the provision of two needles at the bottom of the filter capsule, which may be located with respect to the bores within the cavity such that the amount of air passing through said bores may be controlled by the needles of the filter, depending on the position of the latter within the cavity.

BRIEF DESCRIPTION OF THE DRAWINGS

The novel aspects that are considered characteristic of the present invention will be set forth with particularity in the appended claims. The invention itself, however, both as to its organization and its method of operation, together with other objects and advantages thereof, will be best understood in the following description of certain specific embodiments, when read in connection with the accompanying drawings, in which:

FIG. 1 is a top plan view, partially taken away to show inner details, of an apparatus for increasing the efficiency of carburetors, built in accordance with an embodiment of the present invention and illustrated for serving with a carburetor of the two-throat-type;

FIG. 2 is an elevational cross-sectional view taken along lines 2—2 of FIG. 1 and looking in the direction of the arrows.

DETAILED DESCRIPTION

Figure 3:
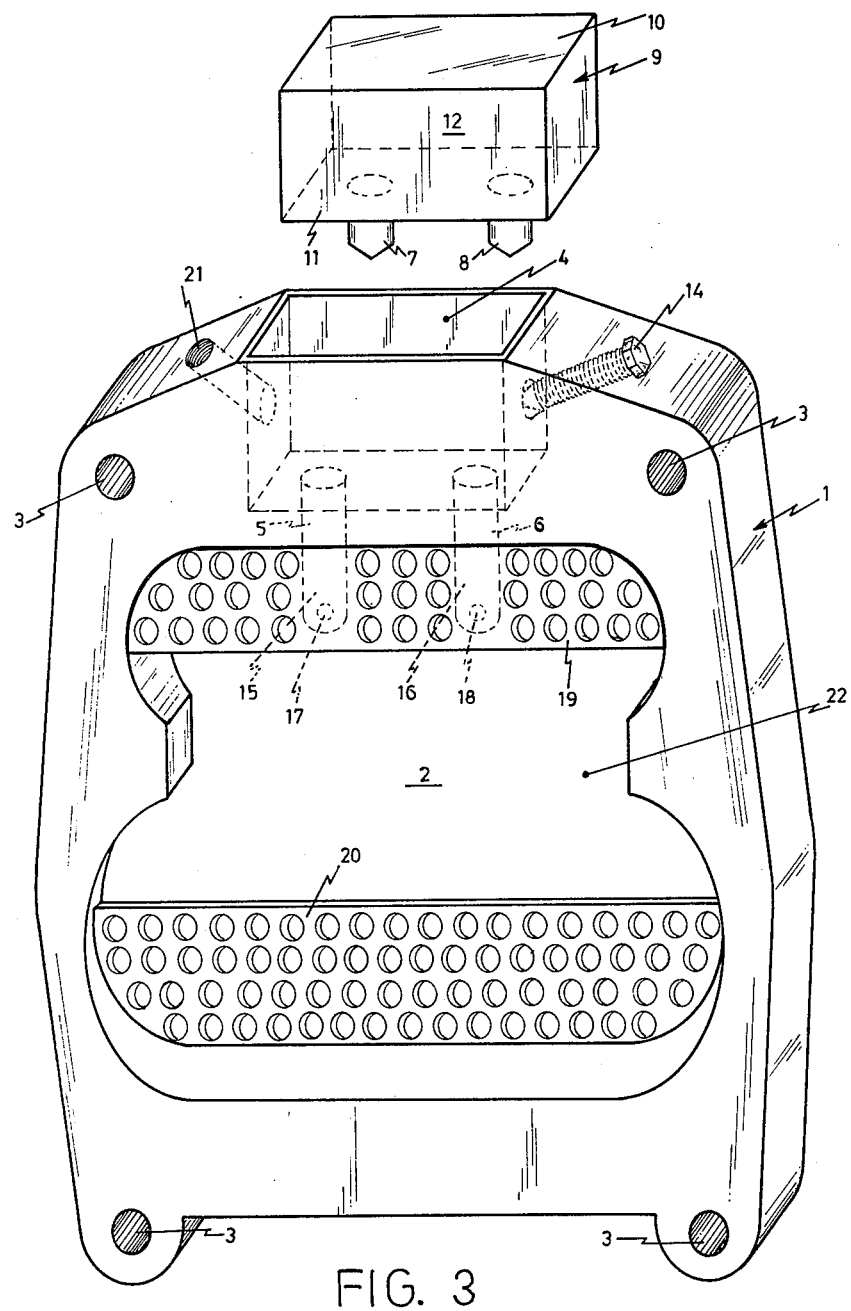
FIG. 3 is a perspective view of a device built in accordance with a second embodiment of the present invention, useful for adaption to a carburetor of the four-throat-type.

Having now more particular reference to the drawings and more specifically to FIGS. 1 and 2 thereof, there is illustrated an embodiment of an antecarburetor apparatus built in accordance with a first embodiment of the present invention, which essentially comprises a metal base 1, having a suitable thickness to contain therin all the parts comprising the apparatus of the present invention, and in which an opening 2 is provided which crosses the total thickness of base 1, and which in the particular instance of the apparatus illustrated in FIGS. 1 and 2, is an opening adapted to be coupled to a two-throat carburetor. The base 1 is provided with a plurality of orifices 3 which serve, as will be clearly apparent to anyone having knowledge in the art, for joining the apparatus of the present invention, by means of suitable bolts, to the admission manifold of an internal combustion engine, placing the same between the mouth of said manifold and the lower part of the carburetor which is normally engaged above the said manifold. As is well known, suitable packings will be interposed between each one of the surfaces of the apparatus of the present invention and the lower surface of the carburetor as well as the upper surface of the mouth of the admission manifold, in order to avoid gas leaks through the joints.

The base 1 comprises a cavity 4, normally of a rectangular shape, which communicates by means of a pair of bored passages 5 and 6, with the side walls of the opening 2, and which extend through a distance inwardly of said opening 2, by means of a pair of pipes or nozzles 15 and 16 which contain, at their outer ends, respective openings 17 and 18, the mouths of which are normally directed downwardly, that is, backwardly of FIG. 1 such as illustrated and such as it may be seen in FIG. 2 of the drawings which illustrates an elevational view. Within cavity 4 a filter element 9 is arranged which comprises a housing consisting of a wire mesh or the like 10, and the bottom of which may be made of a perforate sheet 11, from which a pair of needles 7 and 8 extend towards the bottom of cavity 4, in colinear position with passages 5 and 6, such that, when the filter element 9 is introduced into cavity 4 to a certain extent, which may be varied, the air flow from the atmosphere will be regulated in its passage through the filtering material 12, through the walls 10 and 11, to enter into the cavity 4 and towards passages 5 and 6 and, ultimately, be injected through the nozzles 15 and 16 to be turbulently thrown, by the vacuum caused by the associated engine, through the bores 17 and 18 of nozzles 15 and 16. It will be apparent to anyone skilled in the art that any fastening device may be provided for supporting the filter 9 of the present invention, such as for instance, threaded bolts 13 and 14 introduced through inclined bores, as more clearly illustrated by the reference character 21 in FIG. 3 of the drawings, so that the bolts 13 and 14 may press upon the side walls of filter 9, thereby fixing its relative position in order to admit the suitable amount of air for the machine with which the device of the present invention is associated.

The injection of air through the bores 17 and 18, at a point located inwardly of the opening 2 of base 1 admixes the secondary combustion air with the mixture of air-fuel which is produced by the carburetor which is coupled to the upper surface of the device in accordance with the present invention and, in order to cause very strong turbulences, a diffuser plate 19 is provided, said plate having perforations throughout its surface, which totally covers the pipes 15 and 16, thereby forcing the air-fuel mixture produced by the carburetor to pass through the perforations of the grid 19, said grid being flush with the upper surface of base 1, in order to accomplish a perfect mixing of said air-fuel mixture with the secondary air which is injected through the bores 17 and 19.

Part of the air-fuel mixture produced by the carburetor, passes in points away from the injection nozzles 15 and 16 of the apparatus of the present invention, whereby normally said mixture passing in points away from said nozzles, does not suffer a sufficient homogenization and a suitable admixing with the secondary air injected by said nozzles. Therefore, in order to cure this defect, a second grid 20 is provided at the opening 2 of base 1, flush with the lower surface of said base 1, said second grid also containing a plurality of perforations. The grid 19 extends only through a distance which places the free edge thereof so that the grid only partially covers a predetermined portion of the opening 2, and the grid 20 extends to a distance such that its edge will be located at a predetermined position in opening 2, so that the free edges of both grids 19 and 20 will be located at a predetermined horizontal distance to each other, in order to leave a free gap 22 between said edges, thus permitting the passage of the air-fuel mixture and secondary air, without any appreciable pressure loss by friction, and at the same time accomplishing a true homogeneization of said secondary air with the fuel-air mixture, which may be considered as equivalent to that produced by a complete grid extending throughout the surface of the opening 2, but without producing the disadvantages of an inadequate pressure loss by friction, which may affect the power of the associated engine.

The nozzles 15 and 16, upon injecting secondary air by virtue of the action of the vacuum caused by the engine, inject said air in a direction such that part of said air will be very thoroughly mixed with the air-fuel mixture coming from the carburetor, by means of the generation of energetic turbulences produced by the perforations of grid 19, and part of said air will travel toward the opposite end of said opening 2, in a direction such that the air jets will arrive above grid 20, where said air encounters additional amounts of the air-fuel mixture, in order to mix therewith in a very uniform manner, by virtue of the turbulences generated by grid 20 which is located at the other end of opening 2, whereby the turbulences are such that no area within the opening 2 is left without being affected by said turbulences and, therefore, without the suitably admixing and homogenizing of the original air-fuel mixture with the secondary air introduced through nozzles 15 and 16.

Having now reference to FIG. 3 of the drawings, there is shown an embodiment of antecarburetor built in accordance with a second embodiment of the present invention, which is adapted to be coupled to a four-throat carburetor and in which the same reference numerals as in FIGS. 1 and 2 are used.

It may be seen that in both cases the grids 19 and 20 are located such that they always leave a free gap 22, in order to avoid inadequate friction pressure losses caused by the perforations of the grids 19 and 20.

In the case of the device for a four-throat carburetor illustrated in FIG. 3, it will be clearly seen that grid 19 covers only partially two of the throats of the opening 2, whereas grid 20 covers only partially the other two throats of opening 2, whereby a gap 22 is left which permits the non obstructed passage of the thus formed mixture, being the gap 22 of the device of FIG. 3 of larger dimensions than the gap 22 of FIG. 1 in view of the fact that, in the instance of a four-throat carburetor, the amount of mixture which must be admitted is higher and the friction losses must be necessarily avoided to a higher extent.

Otherwise, the device of FIG. 3 is identical with the device of FIG. 1 and it must be stressed that the apparatus of the present invention may be designed to serve in combination with carburetors having one, two and four throats or any other number of throats, by the simple adaptation of base 1 and opening 2 to the shape and dimensions of the carburetor, without thereby modifying the true spirit and scope of the present invention, the principle of performance of which is exactly the same in anyone of the above mentioned cases.

The admission of secondary air and its mixing with the original air-fuel mixture produced by the carburetor is carried out in all the cases in an identical manner, that is, through the provision of filter 9, passages 5 and 6, nozzles 15 and 16 with the bores 17 and 18, needle valves 7 and 8 fixed on the filter and grids 19 and 10 with suitable perforations, grid 19 being flush with the upper surface of base 1 and grid 20 being flush with the lower surface of said base, and said grids being arranged such that they span, in vertical projection, only partially the total surface of opening 2 of base 1, in order to leave a gap 22 through which the thus formed mixture may be admitted towards the interior of the admission manifold without appreciable friction losses and, nevertheless, with the generation of very energetic turbulences covering the whole of the volume of opening 2, which turbulences cause an absolutely homogeneous and efficient mixing of the original air-fuel mixture with the secondary air admitted through nozzles 15 and 16.

It is however possible to make variations to the above described system, without thereby departing from the spirit of the invention. For instance, the needle valves may be arranged separately from the secondary air filter by the provision of threaded screws adjustable from outside the base. An external mounting may also be provided on the outside of the filter cavity, with a screw coupled to the filter in order to fix its position within the cavity for thusly opening or closing the needle valves, etc. Therefore, it is intended that all such obvious variations fall within the scope of the present invention.

Although certain specific embodiments of the present invention have been shown and described, it must be understood that many modifications thereof are possible. Therefore, the present invention is not to be regarded as restricted except as required by the prior art and by the spirit of the appended claims.

What is claimed is:

1. An apparatus for increasing the efficiency of carburetors for internal combustion engines, suitable for installation between the carburetor and the admission manifold of an internal combustion engine, comprising a base having a substantially uniform thickness; an opening in said base for alignment with the throats of the carburetor and the admission manifold, in order to permit the passage of the air-fuel mixture through said opening along a predetermined axis towards the admission manifold; a cavity formed in said base; said cavity having an opening adapted to receive air from the atmosphere; a pair of passages bored through said base to communicate said cavity with the opening of the base; a corresponding pair of tubular nozzles connected to said passages and extending into said opening, said tubular nozzles ending in respective openings whch are radially offset with respect to the axis of the nozzle; a first perforate plate arranged flush with the upper surface of said base and covering the total length of said nozzles and the openings thereof, said perforate plate extending to a point intermediate the span of said opening of the base; and a second perforate plate arranged flush with the lower surface of the base and in a diametrally opposite position to said first perforate plate, said second perforate plate extending to a point intermediate the span of said opening, such that between the free edges of each one of said perforate plates, seen in vertical projection, a gap will be left to permit the unobstructed passage of the thus formed mixture of secondary air and air-fuel mixture towards the interior of the admission manifold, with which a perfectly homogeneous mixture of the original air-fuel mixture with the secondary air is generated, witout appreciable pressure losses by friction.

2. An apparatus according to claim 1 wherein the openings of said nozzles are eccentrically directed, on the end thereof, downwardly in the direction of the flow of the mixture admitted towards the admission manifold.

3. An apparatus according to claim 2 wherein said nozzles contact the undersurface of said first perforate plate.

4. An apparatus according to claim 3 wherein the bores of said nozzles are arranged in a downward direction, that is, in the direction of the flow of the mixture produced by the carburetor, with a suitable slope so that the jets produced thereby will reach above the second perforate plate which is flush with the lower surface of the base.

5. An apparatus according to claim 4 wherein said first and second perforate plates are integral to the base.

6. An apparatus according to claim 5 wherein said bored passages include needle valves to regulate the flow of secondary air therethrough.

7. An apparatus according to claim 6 wherein a filter element is introduced in said cavity for admitting air into said opening of the base.

8. An apparatus according to claim 7 wherein said needle valves are arranged on the interior surface of and integral to said filter, colinearly with said secondary air passages, so as to regulate the flow of air through the secondary air injection nozzles, depending on the position of the filter within said cavity.

9. An apparatus according to claim 8 wherein the position of said filter within the cavity is fixed by means of at least a threadable bolt which presses against at least one side wall of said filter.

10. An apparatus according to claim 9 wherein the free gap between the edges of said first and second perforate plates is larger as the number of throats of the carburetor increases.

11. An apparatus according to claim 9 wherein said filter is provided with a mounting supported outside the base and having a screw engaging the filter in order to enable the setting of the position of said filter and of the needle valves attached thereto.

* * * * *